(12) United States Patent
Quetel et al.

(10) Patent No.: US 7,866,355 B2
(45) Date of Patent: Jan. 11, 2011

(54) DEVICE FOR INJECTING A FLUID INTO MOVING CONTAINERS

(75) Inventors: François Quetel, Octeville sur Mer (FR); Jérôme Demare, Octeville sur Mer (FR)

(73) Assignee: Sidel Participations, Octeville Sur Mer (FR)

( * ) Notice: Subject to any disclaimer, the term of this patent is extended or adjusted under 35 U.S.C. 154(b) by 957 days.

(21) Appl. No.: 11/692,956

(22) Filed: Mar. 29, 2007

(65) Prior Publication Data

US 2007/0227568 A1    Oct. 4, 2007

(30) Foreign Application Priority Data

Mar. 30, 2006  (FR) .................................. 06 02768

(51) Int. Cl.
*B65B 43/42* (2006.01)
(52) U.S. Cl. .................... 141/147; 141/92; 141/144; 141/145; 141/237
(58) Field of Classification Search ............ 141/2, 141/9, 11, 69, 85, 90–92, 131, 144–147, 141/234–237
See application file for complete search history.

(56) References Cited

U.S. PATENT DOCUMENTS

| | | | | |
|---|---|---|---|---|
| 3,358,719 A | * | 12/1967 | Minard | 141/86 |
| 4,254,804 A | * | 3/1981 | Wada et al. | 141/40 |
| 5,168,905 A | * | 12/1992 | Phallen | 141/1 |
| 5,551,491 A | * | 9/1996 | Baruffato et al. | 141/145 |
| 6,065,508 A | * | 5/2000 | Ball et al. | 141/67 |
| 6,761,191 B2 | * | 7/2004 | Rosen et al. | 141/91 |
| 6,810,927 B2 | * | 11/2004 | Ronchi | 141/146 |
| 7,114,535 B2 | * | 10/2006 | Hartness et al. | 141/145 |

FOREIGN PATENT DOCUMENTS

| | | |
|---|---|---|
| DE | 297 13 155 U1 | 9/1998 |
| EP | 436 042 A1 | 10/1991 |
| FR | 2 872 081 A1 | 12/2005 |
| GB | 1 212 503 A | 11/1970 |
| WO | WO 98/01344 A1 | 1/1998 |
| WO | WO 02/072158 A1 | 3/2002 |

\* cited by examiner

*Primary Examiner*—Timothy L Maust
(74) *Attorney, Agent, or Firm*—Sughrue Mion, PLLC

(57) ABSTRACT

A movable conveyor (12) having a plurality of container supports (28), a plurality of nozzles (30) for injecting fluid into the containers, a fluid-feed track (32) for the nozzles (30) and a plurality of pipes (34) to convey the fluid to the nozzles (30), each having an inlet (36) arranged in the feed track (32). Further, a fixed fluid dispenser (14) alongside the conveyor (12), designed to introduce fluid successively into the inlets (36), this dispenser (14) having a distributor (44) positioned facing the feed track (32).

The distributor (44) defines a manifold (46) which extends along a length of the conveyor corresponding to the number N of inlets (36) selected, a seal (50) being provided to ensure a sealed contact between the manifold (46) and the feed track (32), and the dispenser (44) has means (52) to push the manifold (46) against the feed track (32) of the conveyor (12).

11 Claims, 2 Drawing Sheets

DEVICE FOR INJECTING A FLUID INTO MOVING CONTAINERS

TECHNICAL FIELD

The present invention concerns a device to inject a fluid into moving containers.

Such a device is for example used in systems for the manufacture of bottles designed to receive alimentary liquids, in order to sterilize the inside of the bottle blanks with the aid of a sterilizing fluid, usually a gas.

BACKGROUND TO THE INVENTION

The devices currently known are of the type comprising:
a movable conveyor having:
  a plurality of container supports distributed along the conveyor;
  a plurality of nozzles for injecting fluid into the containers, each one mounted facing a respective container support;
  a nozzle fluid-feed track, arranged along the conveyor, and
  a plurality of pipes for conveying fluid to the nozzles, each one connected to a respective nozzle and having an inlet arranged in the feed track, the inlets being distributed along the feed track, and
a fixed fluid dispenser alongside the conveyor, designed to introduce fluid successively into the inlets, this dispenser comprising:
  a distributor positioned facing the feed track and designed to cover a number N of inlets selected at the time of the relative displacement of the feed track in relation to the distributor, and
  means to feed the distributor with fluid.

In such a known device, the conveyor is a carousel and the track forms a central hub into which the distributor extends, in the form of a fixed shaft.

The distributor and the track delimit between them a circumferential groove fed with fluid by the distributor. An obstruction seal is fixed to the distributor inside the groove, through an arc of a preset length so as to obstruct a given number of inlets. Thus, the distributor covers and supplies with gas those inlets which are not obstructed by the obstruction seal.

Circular seals are mounted above and below the groove, between the distributor and the carousel.

In order to ensure that the seals provide a good seal, it is necessary to ensure a relative rotary movement between the conveyor and the distributor that is as accurate as possible. Thus, the carousel is mounted rotating in relation to the distributor by means of two bearings, for example ball-bearings, arranged on either side of the groove. These bearings are located as far as possible from one another along the axis of rotation so that no radial clearance is possible.

A consequence of this constraint is that the known device occupies considerable space along the axis of rotation and moreover uses rollers that must operate at a high temperature, which makes them costly.

SUMMARY OF THE INVENTION

The invention aims to overcome the above-mentioned drawbacks.

For this purpose, the invention relates to a device to inject a fluid into moving containers, of the type mentioned above, wherein the distributor defines a manifold which extends along a length of the conveyor corresponding to the number N of inlets selected, a seal being provided to ensure a sealed contact between the manifold and the feed track, and in that the dispenser comprises means to push the manifold against the conveyor feed track.

Thanks to the invention, sealing between the conveyor and the dispenser is ensured by the seal being compressed between the manifold and the track by the means for pushing the said manifold. The presence of bearings is therefore no longer necessary and the size of the device can be reduced.

A device according to the invention may also have one or more of the following characteristics:
  the movable conveyor has a carousel mounted rotating around an axis of rotation, the container supports being distributed on the carousel about the axis of rotation and the fluid feed track being a circular track defined on the carousel about the axis of rotation;
  the track extends in its transverse dimension substantially perpendicular to the axis of rotation;
  the track extends in its transverse dimension substantially parallel to the axis of rotation;
  the feed track extends along a hub of the carousel, the inlets are arranged towards the inside of the carousel and the distributor is arranged in the space delimited by the hub;
  the feed track extends round the periphery of the carousel, the inlets are arranged towards the outside of the carousel and the distributor is arranged radially on the outside of the carousel,
  the means to push the manifold against the feed track comprise a pneumatic actuator;
  the distributor and the fluid feed means are connected to each other and mounted together in translation along an axis of translation, and the means for pushing the manifold are configured to push the distributor and feed means assembly;
  the axis of translation intersects the feed track substantially perpendicularly;
  the fluid feed means are configured to supply a gaseous mixture of air and sterilization agent at a preset temperature, preferably 130° C.;
  the conveyor has heating means to keep at least the pipes at a preset temperature, preferably 130° C.

BRIEF DESCRIPTION OF THE DRAWINGS

The invention will be better understood from the following description given purely by way of example and with reference to the accompanying drawings, in which.

DESCRIPTION OF PREFERRED EMBODIMENTS

Figure 1:
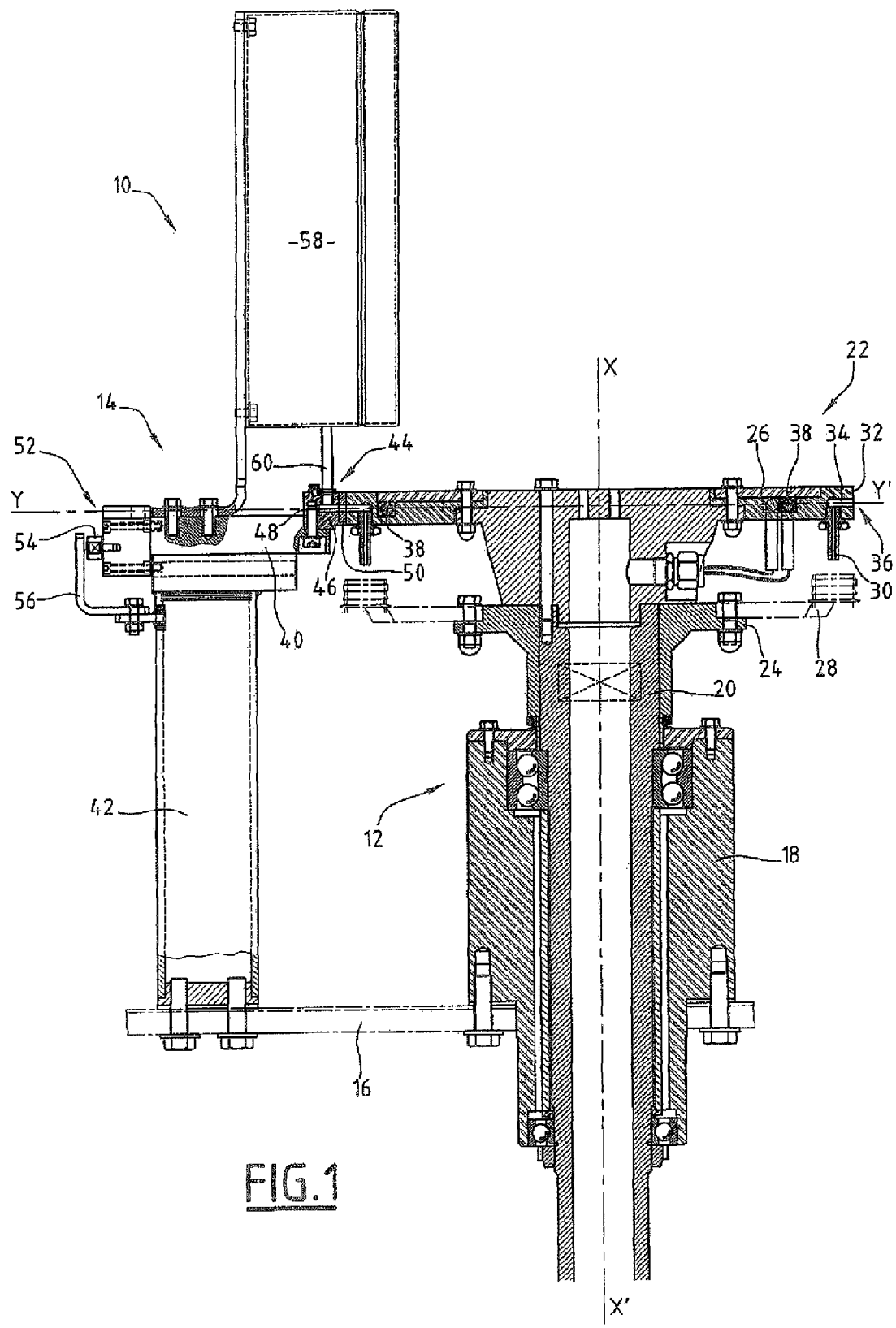
FIG. 1 is a vertical cross-section of a device according to the invention.

With reference to FIG. 1, a device 10 for injecting fluid into moving containers is shown.

The device 10 has a movable conveyor 12 and a fluid dispenser 14, both mounted on a base 16.

The conveyor 12 has a bearing 18 connected to the base 16, in which a vertical column 20 is mounted rotating about an axis X-X'. The column 20 supports, at its upper end, a carousel 22 thus mounted rotating about the axis X-X'.

The carousel 22 has a lower circular horizontal plate 24 and an upper circular horizontal plate 26 mounted one above the other along the axis X-X'.

The lower plate 24 has a plurality of container supports 28 uniformly distributed about the axis of rotation X-X', in other words separated by a fixed gap.

The upper plate 26 in turn has a plurality of nozzles 30 for injecting fluid into the containers. The number of injection nozzles 30 corresponds to the number of container supports 28. Each injection nozzle 30 is mounted pointing downwards, facing a respective container support 28. The outer part of the upper plate 26 defines a fluid feed-track 32 for the nozzles 30, as will be explained below. The feed track 32 is circular and cylindrical, that is it extends, in its transverse dimension, parallel to the axis of rotation X-X'.

A plurality of pipes 34 that convey fluid to the nozzles 30 are arranged in the upper plate 26. Each pipe 34 is connected to a respective nozzle 30 and has an inlet 36 arranged in the feed track 32 towards the outside of the carousel 22, that is emerging opposite the axis of rotation X-X'. The inlets 36 of the pipes 34 are distributed uniformly along the feed track 32 about the axis X-X', in other words separated by a fixed gap corresponding angularly with that of the container supports 28.

The upper plate 26 is also fitted with a heating element 38 extending circularly about the axis of rotation X-X'. The element 38 is designed to keep the upper plate 26 at a preset temperature, 130° C. in the example described.

The fluid dispenser 14 has a slide 40 mounted movable in translation along a horizontal axis Y-Y' on a foot 42 connected to the base 16.

Axis Y-Y' is positioned to pass through the axis of rotation X-X' so as to intersect the track 32 of the carousel 22 perpendicularly. The side of the slide 40 closest to the carousel 22 along axis Y-Y' has a distributor 44 positioned facing the feed track 32. The distributor 44 covers five inlets selected at the time of the relative displacement of the feed track 32 in relation to this distributor 44. This point shall be explained in detail below, with reference to FIG. 2.

The distributor 44 defines a manifold 46 delimiting a general feed chamber 48, which communicates with the five selected inlets.

The distributor 44 is also provided with a seal 50 fitted between the manifold 46 and the feed track 32, to ensure a sealed contact between these two parts. The material of the seal 50 is, in the example described, obtained from a pure polyetheretherketone resin. The seal 50 has a constant thickness and is fixed to the inner face of the manifold 46 by screws 47 (FIG. 2).

The side of the slide 40 furthest from the carousel 22 along axis Y-Y' has a pneumatic actuator 52 fitted with an external piston 54 designed to bear on an end rod 56 connected to the foot 42. The actuator 52 is positioned so as to push the slide 40 along axis Y-Y' towards the carousel in order to push the manifold 46 against the feed track 32.

The fluid dispenser 14 also has a unit 58 to feed fluid to the distributor 44. This feed unit 58 is connected integrally to the slide 40 and arranged above the distributor 44. A general feed pipe 60 connects the feed unit 58 to the distributor 44 and, more precisely to the general feed chamber 48. The fluid feed unit 58 is configured so as to supply a gaseous mixture of air and $H_2O_2$ at a preset temperature of 130° C. in the example described.

Figure 2:
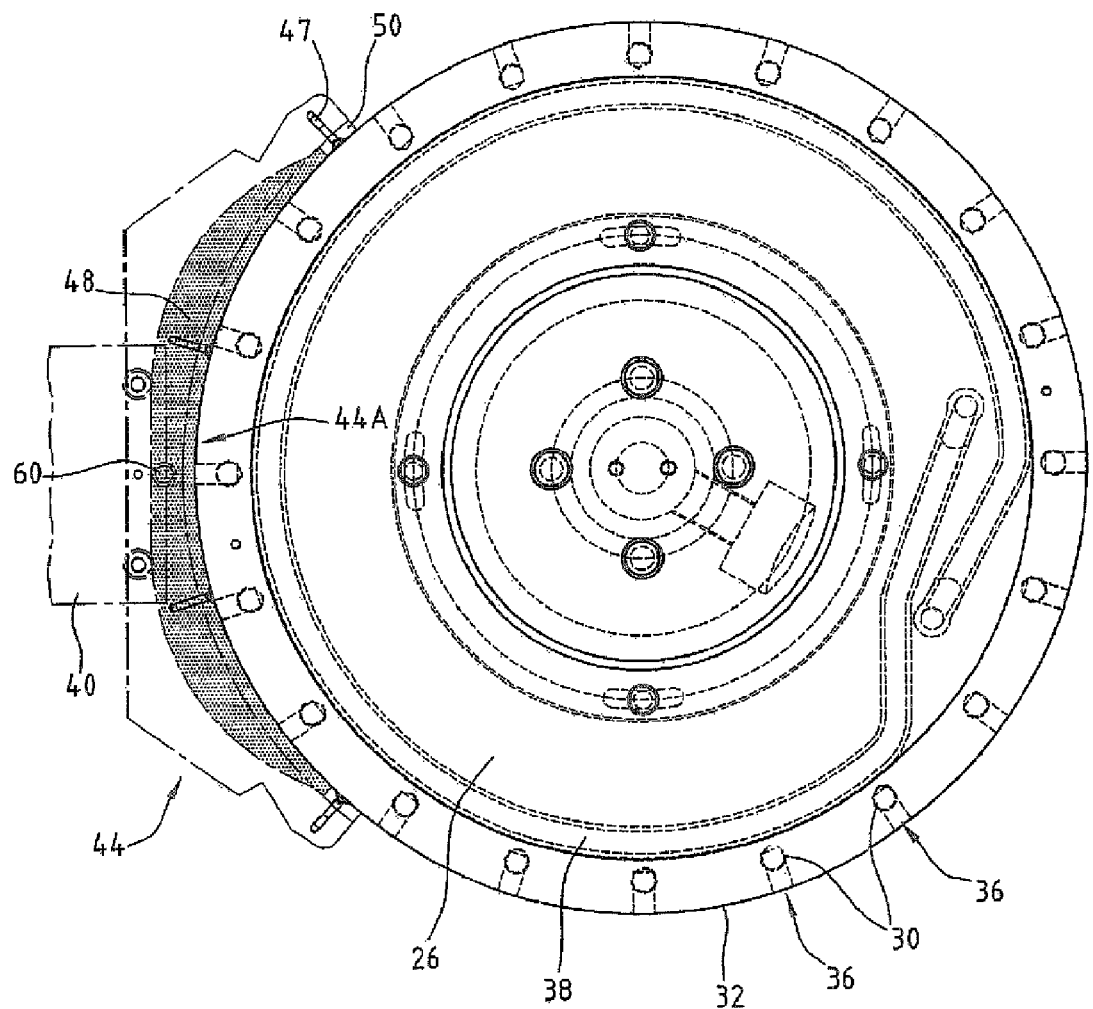
FIG. 2 is a cutaway bird's eye view of the device shown in FIG. 1.

With reference to FIG. 2, the distributor 44 has the general shape of a crescent delimiting an inner face 44A curved around a radius corresponding to that of the circular track 32. Thus the inner face 44A, which is the face of the seal 50, is in contact along its entire length with the circular track 32. The length of the inner face 44A corresponds to the length occupied by five successive inlets, round the feed track 32.

The general feed chamber 48 is formed by a slit made in the inner face 44A sufficiently deep to reach the general feed pipe 60. The chamber 48 has a horizontal profile which is also in the shape of a crescent.

Furthermore, FIG. 2 shows that the ends of the heating element 38 of the upper plate 26 overlap each other horizontally. This is due to the fact that the ends of the heating element provide less heat than the other portions of this element. Overlapping therefore provides a uniform heat.

In operation, a motor (not shown) drives the column 20 and the carousel 22 in rotation about the axis X-X', while the element 38 brings and keeps the temperature of the upper plate 26 at 130° C.

The containers, for example blanks which will later be used to form bottles, are transferred one by one onto the container supports 28 of the lower plate 24, substantially opposite the fluid dispenser 14.

At the same time, the feed unit 58 supplies a gaseous mixture of air and $H_2O_2$ in preset proportions and at a temperature of 130° C. corresponding to that maintained in the upper plate 26. This temperature allows the mixture to be kept in the form of a dry vapour, in other words without droplets. The general feed chamber 48 is thus filled with the gaseous mixture, which feeds the five nozzles 30 of which the inlet 36 of the pipe 34 is covered by the manifold 46.

Thus, when the blanks rotate with the carousel, the nozzle facing each blank will be fed as its inlet 36 is within the manifold 46.

Note that all of the blanks will be sterilized by the gaseous mixture in the same manner, whatever the shape of the general feed chamber 48, because the inlets 36 all follow the same path in relation to the manifold 46 and therefore in relation to the chamber 48.

For the entire time that the device is in operation, the pneumatic actuator 52 pushes the manifold 46 against the track 32. The seal 50, fixed to the manifold 46, thus rubs against the track 32 and ensures the contact between the distributor 44 and the track 32. The pressure exerted by the actuator 52 guarantees a good seal between the fixed rotating distributor 44 and the movable carousel 22. Furthermore, this configuration at the same time has the advantage of taking up the wear of the seal 50 due to its rubbing on the movable track 32.

Note that the judicious positioning of the feed track 32 round the periphery of the carousel 22 allows very short pipes 34 to be used, since the nozzles 30 are also arranged round the periphery of the carousel 22. Thus, the loss of heat energy of the gas along each pipe 34 is low, which reduces energy consumption in the element 38 required to keep the upper plate 26, and therefore the gas in the pipes 34, at 130° C.

Furthermore, arranging the distributor 44 on the outside of the carousel 22 makes it very easy to separate the carousel 22, in order to perform maintenance operations such as changing the seal 50 when it has become too badly worn.

Yet the invention is not limited to the embodiment shown in the Figures.

For example, in another embodiment, the feed track 32 is annular, that is, it extends in its transverse dimension perpendicularly to the axis of rotation X-X'. In this case, the track 32 can be arranged on the top of the upper plate 26 and the fluid dispenser 14 duly adapted: the manifold 46 is notably pushed downwards, parallel to the axis of rotation.

In yet another embodiment, the upper plate 26 has a central hub into which the distributor 44 extends. In this case, the circular track forms the hub and is again cylindrical, but this time faces towards the axis of rotation X-X'.

The invention claimed is:

1. Device for injecting a fluid into moving containers, of the type comprising:
 a movable conveyor having:
  a plurality of container supports distributed along the conveyor;
  a plurality of nozzles for injecting fluid into the containers, each one mounted facing a respective container support;
  a nozzle fluid-feed track, arranged along the conveyor, and
  a plurality of pipes for conveying fluid to the nozzles, each one connected to a respective nozzle and having an inlet arranged in the feed track, the inlets being distributed along the feed track, and
 a fixed fluid dispenser alongside the conveyor, designed to introduce fluid successively into the inlets, said fixed fluid dispenser comprising:
  a distributor positioned facing the feed track and designed to cover a number N of inlets selected at the time of the relative displacement of the feed track in relation to the distributor, and
  means to feed the distributor with fluid,
 wherein the distributor defines a manifold which extends along the length of the conveyor communicating with the number N of inlets selected, a seal being provided to ensure a sealed contact between the manifold and the feed track, and in that the dispenser comprises means to push the manifold against the conveyor feed track.

2. Device according to claim 1, wherein the movable conveyor has a carousel mounted rotating around an axis of rotation, the container supports being distributed on the carousel about the axis of rotation and the fluid feed track being a circular track defined on the carousel about the axis of rotation.

3. Device according to claim 2, wherein the track extends in its transverse dimension substantially perpendicular to the axis of rotation.

4. Device according to claim 2, wherein the track extends in its transverse dimension substantially parallel to the axis of rotation.

5. Device according to claim 4, wherein the feed track extends along a hub of the carousel, in that the inlets are arranged towards the inside of the carousel and in that the distributor is arranged in the space delimited by the hub.

6. Device according to claim 4, wherein the feed track extends around the periphery of the carousel, in that the inlets are arranged towards the outside of the carousel and in that the distributor is arranged radially on the outside of the carousel.

7. Device according to claim 1, wherein the means to push the manifold against the feed track comprise a pneumatic actuator.

8. Device according to claim 1, wherein the distributor and the fluid feed means are connected to each other and mounted together in translation along an axis of translation, and in that the means for pushing the manifold are configured to push the distributor and feed means assembly.

9. Device according to claim 8, wherein the axis of translation intersects the feed track substantially perpendicularly.

10. Device according to claim 1, wherein the fluid feed means are configured to supply a gaseous mixture of air and sterilization agent at a preset temperature, preferably 130° C.

11. Device according to claim 1, wherein the conveyor has heating means to keep at least the pipes at a preset temperature, preferably 130° C.

* * * * *